United States Patent [19]

Huebner

[11] 4,120,797

[45] Oct. 17, 1978

[54] CROSS-FLOW INCLINED PLATE CLARIFIER

[76] Inventor: Werner P. E. Huebner, 6 Sweetbriar Ct., Toronto, Ontario, Canada, M4A 2G5

[21] Appl. No.: 773,321

[22] Filed: Mar. 1, 1977

[51] Int. Cl.² .............................................. B01D 21/10
[52] U.S. Cl. .................................................... 210/522
[58] Field of Search .................. 210/521, 522, 83, 519

[56] References Cited

U.S. PATENT DOCUMENTS

| | | | |
|---|---|---|---|
| 1,732,386 | 10/1929 | Sprockhoff | 210/521 X |
| 2,119,013 | 5/1938 | Kerns et al. | 210/521 |
| 2,595,838 | 5/1952 | Fuglie | 210/521 X |
| 2,673,451 | 3/1954 | Gariel | 210/521 X |
| 2,772,781 | 12/1956 | Unthank | 210/519 X |
| 3,494,475 | 2/1970 | Hedstrom et al. | 210/521 |
| 3,710,949 | 1/1973 | Murkes | 210/522 |
| 3,957,656 | 5/1976 | Castelli | 210/521 |
| 4,056,477 | 11/1977 | Ravitts | 210/519 X |

Primary Examiner—William A. Cuchlinski, Jr.
Attorney, Agent, or Firm—Fitch, Even, Tabin & Luedeka

[57] ABSTRACT

An inclined plate clarifier adapted for horizontal flow of liquid to be clarified through flow passages formed between inclined plates, the clarifier being constructed to facilitate assembly, installation and cleaning. The clarifier includes inlet and outlet means at opposite ends of the inclined clarifier plates with baffles and restrictions for regulating flow of the liquid to be clarified. The clarifier also includes transversely arranged interface plates for regulating the passage of separated materials from the flow passages, slave plates being selectively employed to vary the width of the clarifier flow passages between the inclined plates.

28 Claims, 6 Drawing Figures

CROSS-FLOW INCLINED PLATE CLARIFIER

BACKGROUND OF THE INVENTION

The present invention relates to clarifiers of a type wherein flow passages formed between a plurality of inclined plates and more particularly to such clarifiers wherein a liquid to be clarified flows generally horizontally through the flow passages.

Various types of clarifiers are being developed for use in place of large settling basins, tanks or the like where liquid is held over prolonged periods of time until clarification naturally occurs because of normal sedimentation rates and phase separation phenomenon. Inclined plate clarifiers are of increasing interest particularly in industrial and municipal water treatment facilities because of increasingly rigid requirements for effluent quality. In addition, settling basins and the like depend upon relatively long holding periods in order to accomplish separation and accordingly require excessive amounts of space. Inclined plate clarifiers in general have been found a very desirable means for overcoming these problems.

Inclined plate clarifiers are commonly characterized by aligned flow passages formed by a plurality of inclined plates. The use of such inclined plate clarifiers has been found to be a most effective means for increasing the settling area per unit volume while at the same time reducing size and cost as well as increasing the quality or clarity of effluent from the water treatment facility.

Inclined plate clarifiers may generally be divided into classes adapted for vertical flow or "cross-flow". Vertical flow clarifiers may be adapted for operation in either an "up-flow" or "down-flow" mode with relatively heavy and/or light phase material being removed.

The present invention particularly contemplates a cross-flow clarifier in which liquid to be clarified flows generally horizontally through flow passages formed by the inclined plates. Thus, inlet and outlet chambers for the liquid are in communication with the lateral ends of the inclined plates rather than with the upper and lower ends of the plates as in a vertical flow clarifier.

A cross-flow clarifier of this type may therefore require somewhat greater floor space or area than a vertical flow clarifier. However, the overall volume is approximately equal for the two types of clarifiers since it is not necessary in a cross-flow clarifier to provide means at the upper and lower ends of the inclined plates for entry and exit of the liquid to be clarified. In addition, since the liquid to be clarified flows horizontally, cross-flow clarifiers may be easily adapted to facilitate the removal of separate phases at both the tops and bottoms of inclined plates.

Otherwise, cross-flow clarifiers encounter many of the same problems as the vertical flow clarifiers. For example, it is commonly necessary that the clarifier be uniquely tailored to a particular application where the clarifier is being used. Accordingly, the cost of designing and installing clarifiers for each application tends to be quite substantial. For the same reason, operating procedures for such clarifiers have tended to vary widely in different applications and under different operating conditions.

In adapting the clarifier for operation under such widely varying conditions, it is necessary to assure that the clarifier can be readily assembled during its installation or disassembled and reassembled for example during cleaning.

In addition, it is a common problem in such clarifiers to regulate fluid flow both into and out of the flow passages between the inclined plates while maintaining uniform distribution of the fluid between the passages formed by the various plates.

Particularly with a cross-flow clarifier of the type contemplated by the present invention, it is a problem to maintain laminar horizontal flow of the liquid to be clarified through the flow passages between the inclined plates while allowing a heavier phase, usually suspended solids, to pass downwardly toward a settling chamber beneath the inclined plates. At the same time, a lighter phase such as oil, for example, may pass upwardly toward the top of the inclined plate for collection in a suitable separation chamber.

Various clarifiers in the prior art have demonstrated an ability to resolve or satisfy one or more of these problems. However, a need has been found to remain for a cross-flow clarifier which is adaptable to a variety of operating conditions and which may be employed to produce a relatively high quality effluent.

SUMMARY OF THE INVENTION

Accordingly, it is an object of the present invention to provide a cross-flow inclined plate clarifier for overcoming one or more problems of the type discussed above.

More specifically, it is an object of the invention to provide a cross-flow clarifier which readily permits assembly and disassembly of its components in order to facilitate installation and cleaning of the clarifier.

It is an additional object of the invention to provide a cross-flow clarifier wherein inlet and outlet passages are arranged adjacent opposite lateral ends of the inclined plates to facilitate operation of the clarifier. In this connection, the clarifier of the present invention includes inlet and outlet channels at opposite ends of the plates, suitable baffles and flow restrictions being provided in order to assure proper laminar flow through the clarifier.

It is a still further object of the invention to provide a cross-flow clarifier including an inlet arrangement wherein heavy phase material suspended in an effluent for the clarifier may pass directly to a settling chamber in order to minimize or eliminate clogging or fouling of the flow passages between the inclined plates.

Yet another object of the present invention is to provide a design for a cross-flow clarifier wherein spaced apart inclined clarifier plates form flow passages within the clarifier, the clarifier further being adapted for the selective installation of inclined slave plates therebetween in order to decrease the effective width of the flow channels.

An even further object of the invention is to provide a unique interface arrangement at the lower and/or upper ends of the flow passages between the inclined plates for regulating communication between the flow passages and a settling chamber formed below the inclined plates or a separation chamber formed thereabove. The interface arrangement preferably comprises a plurality of inclined interface plates arranged transversely of the inclined clarifier plates and forming restricted passages which diminish in size from one lateral end of the inclined clarifier plates toward the other.

Additional objects and advantages of the present invention are made apparent in the following description having reference to the accompanying drawings.

DESCRIPTION OF THE PREFERRED EMBODIMENTS

Figure 1:
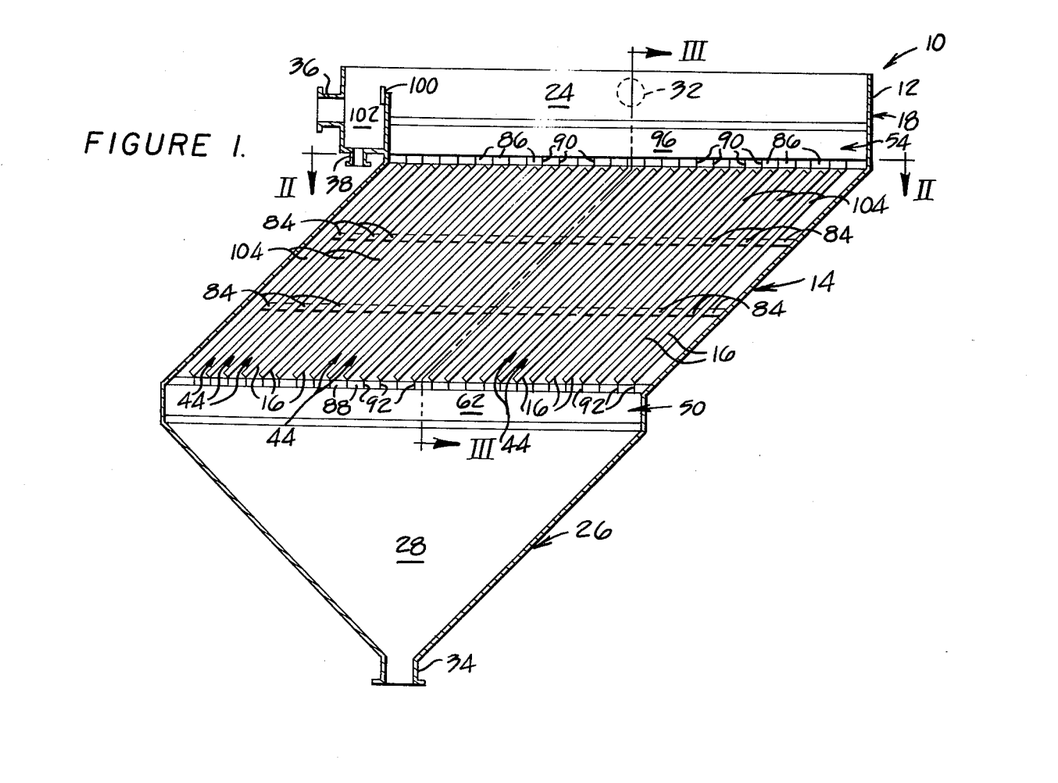
FIG. 1 is a side view in elevation, with parts in section, of a cross-flow inclined plate clarifier according to the present invention.
Figure 2:
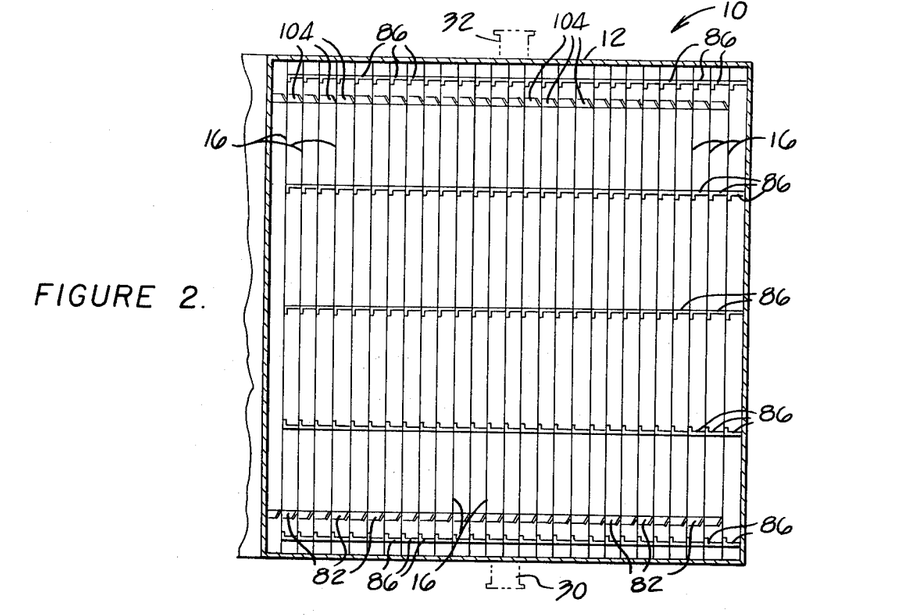
FIG. 2 is a plan view taken along section line II—II in FIG. 1.
Figure 3:
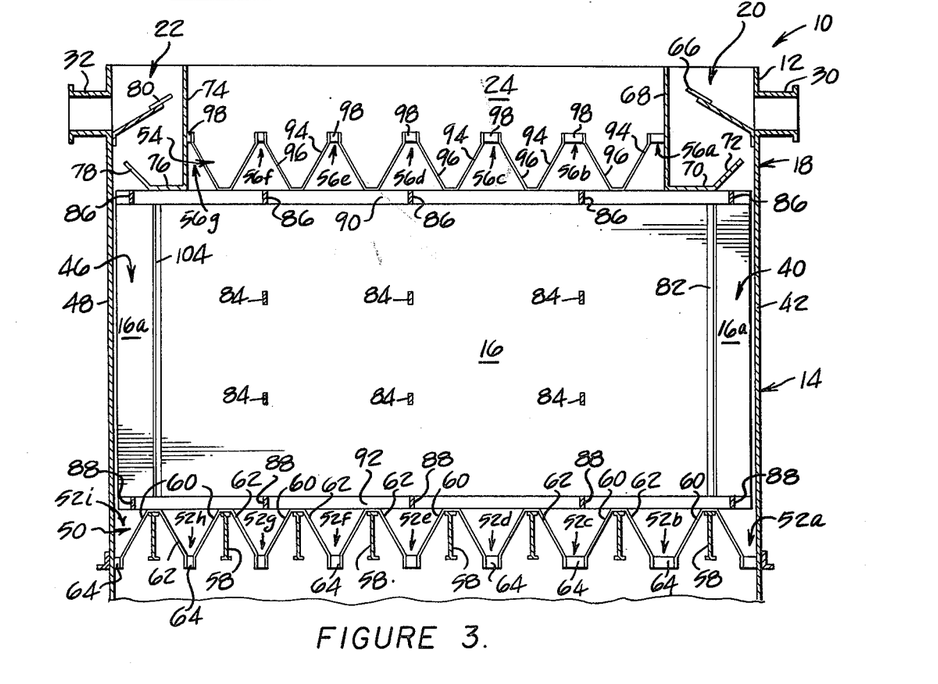
FIG. 3 is a view of a portion of the clarifier taken along section line III—III of FIG. 1.
Figure 4:
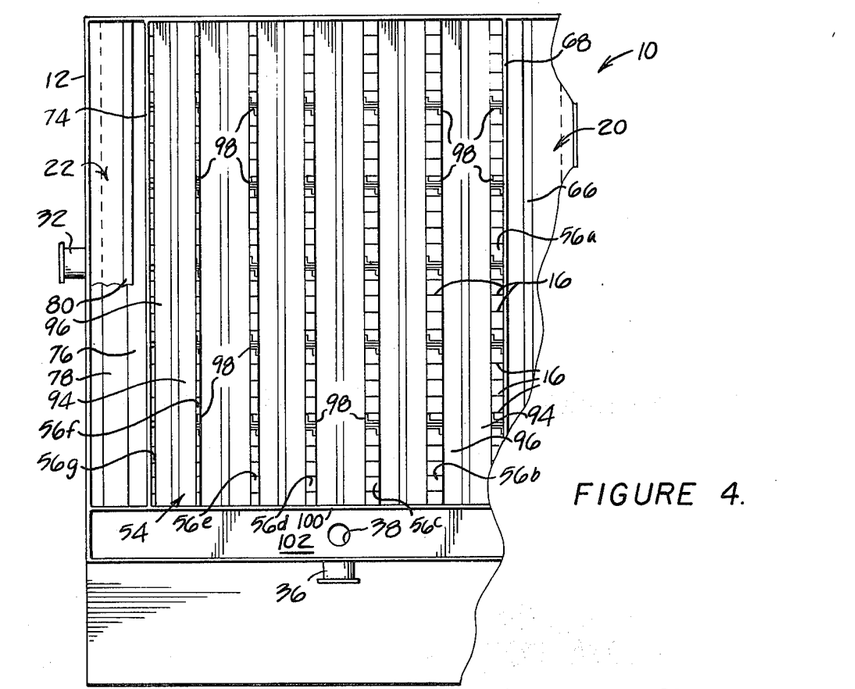
FIG. 4 is a fragmentary plan view of the clarifier of FIG. 1.

Referring now to the drawings and particularly to FIGS. 1-3, a cross-flow inclined plate clarifier of the type contemplated by the present invention is generally indicated at 10. The clarifier 10 has a housing 12 with a trapezoidal separation section 14 containing a plurality of inclined clarifier plates 16 which are arranged in parallel spaced apart relation. An upper section 18 of the clarifier housing includes inlet and outlet chambers 20 and 22 as well as a separation chamber 24 for receiving relatively low density phase material during operation of the clarifier. The construction and operation of these portions of the clarifier are described in greater detail below.

The clarifier housing 12 also includes a tapered portion 26 forming a settling chamber 28 beneath the inclined clarifier plates 16 in the housing section 14. As will be described in greater detail below, the tapered housing portion 26 for the settling chamber 28 may be formed as an integral portion of the entire clarifier housing 12. On the other hand, the settling chamber 28 may be formed by a separate structure which is combined with the rest of the clarifier 10 during installation. The settling chamber may even be formed by the floor or supporting structure upon which the clarifier 10 is to be mounted.

Liquid to be clarified is introduced into the inlet chamber 20 of the clarifier through an inlet conduit 30 with clarified effluent being removed from the outlet chamber 22 of the clarifier 10 through an outlet conduit 32. A relatively heavy phase, usually suspended solids, may be continuously or intermittently removed from the settling chamber 28 through a sediment outlet 34. Similarly, low density material such as an oil which is separated during operation of the clarifier and collected within the separation chamber 24 may be continuously or intermittently removed from the clarifier through a conduit indicated at 36. A drain conduit 38 is associated with the low density outlet conduit 36 for a purpose described in greater detail below.

Before proceeding with a more detailed description of the clarifier 10, it is generally noted that important features of the present invention include the overall construction of the clarifier 10 and the manner in which its various components may be assembled (or disassembled) to facilitate installation or cleaning of the clarifier.

Another important feature of the invention relates to the manner in which the liquid to be clarified is directed into and out of the flow passages between the clarifier plates 16. In this connection, liquid to be clarified which enters the inlet chamber 20 from the inlet conduit 30 is directed toward an inlet channel 40 formed adjacent an end wall 42 of the clarifier housing 12. After flowing horizontally through flow channels 44 formed between the inclined clarifier plates 16, clarified liquid passes into an outlet channel 46 formed adjacent the opposite end wall 48 from where it flows into the outlet chamber 22 and exits the clarifier through the outlet conduit 32.

An additional feature of the present invention is an interface assembly 50 forming a plurality of transverse restrictive channels 52 for regulating communication between the flow passages 44 and the settling chamber 28. The restrictive channels 52 are sized to permit the suspended solids from the flow passages 44 to pass freely into the settling chamber 28. However, a more important function of the interface assembly is to prevent reverse flow of liquid from the settling chamber 28 toward or into the flow passages 44, particularly adjacent the outlet channel 46. In this manner, the interface assembly 50 prevents or minimizes liquid flow from the settling chamber 28 toward the flow passages 44 which might undesirably reintroduce suspended solids into the clarified liquid, particularly adjacent the outlet channel 46.

Yet another feature of the invention is provided in combination by the inlet channel 40 and the interface assembly 50, particularly one of the restricted channels indicated at 52a formed directly below the inlet channel 40. As liquid to be clarified is introduced into the inlet channel 40, it may contain a substantial amount of suspended solids which readily separate and drop downwardly. The restrictive channel 52a directly communicates the inlet channel 40 with the settling chamber 28 so that these solids may enter the settling chamber before the liquid from the inlet channel flows into the respective flow passages 44.

An additional interface assembly 54 is arranged above the inclined clarifier plate 16 and similarly forms a plurality of restrictive channels 56a—56g for regulating communication between the flow passages 44 and the separation chamber 24.

To describe the clarifier in greater detail, a plurality of structural beams 58 span the clarifier housing transversely of the inclined clarifier plates 16 in order to provide support for the relatively heavy plates 16. In addition, the beams 58 are spaced apart as illustrated in FIG. 3 to provide support and spacing for the interface assembly 50.

The interface assembly 50 comprises a plurality of oppositely inclined plates 60 and 62. Each adjacent pair of inclined plates 60 and 62 is preferably formed as an inverted V-shaped element having its apex supported upon one of the beams 58. The downwardly projecting ends of the inclined plates 60 and 62 are spaced apart by brackets indicated at 64a-64h in order to form the restrictive channels 52. The brackets are formed in a sequence of sizes to maintain sequential sizing for the restrictive channels 52. Those restrictive channels adjacent the inlet channel 40, for example, 52b-52d, are substantially larger than the restrictive channels adjacent the outlet channel 46, for example the restrictive channels indicated at 52e-52g. The sequential sizing of the restrictive channels accepts or passes the relatively greater flow of solids or heavy density material approaching the settling chamber 26 as the liquid to be clarified first enters the flow passages 44. As the liquid approaches the outlet channel 46, there is a lesser amount of suspended solids to be removed from the liquid and it is more important to restrict or limit the reverse liquid flow from the chamber 28 toward the flow passages 44. This function is of course accomplished by the more limited sizing of the restrictive channels adjacent the outlet end of the flow passages.

As was indicated above, liquid to be clarified is introduced into the clarifier through the inlet conduit 30 and inlet chamber 20. Liquid from the inlet conduit 30 first flows over an angled restriction plate 66 which maintains uniform velocity and volume of flow into all portions of the inlet chamber 20. The inlet chamber 20 is formed by a vertical divider plate 68 which extends transversely above the inclined clarifier plates 16.

The vertical divider plate 68 extends the full width of the clarifier housing, as may be best seen in FIG. 2, in order to enclose the inlet chamber 20. The inlet chamber 20 is further separated from the flow passages 44 between the inclined clarifier plates by means of a baffle plate 70 which also extends transversely across the tops of the inclined plates. However, the baffle plate 70 is arranged horizontally and extends laterally from the vertical divider plate 68 toward the end wall 42 where it has an angled portion 72 for regulating the flow of liquid from the inlet chamber 20 toward the inlet channel 40.

The outlet chamber 22 is similarly formed by a vertical divider plate 74 in combination with a horizontal baffle plate 76 having an angled portion 78. An angled flow restriction plate 80 similarly serves to regulate flow from the outlet chamber 22 toward the outlet conduit 32.

The separation chamber 24 is formed between the vertical divider plates 68 and 74 as may be best seen in FIG. 3.

The interface assembly 54 between the inclined clarifier plates 16 and the separation chamber 24 is of substantially similar but inverted construction as the interface assembly 50 which was described above. The restrictive channels 56 also successively decrease in size toward the outlet channel 46 in order to prevent or minimize reverse flow of liquid from the separation chamber 24 toward the flow passages 44.

As described above, liquid to be clarified passes over the angled baffle plate 72 and enters into the inlet channel 40. The ends of the inclined clarifier plates 16 are slightly spaced away from the end plate 42 in order to form the inlet channel 40. However, the inlet channel 40 is more positively defined by a series of flow restrictions 82 vertically mounted upon each of the inclined clarifier plates in spaced apart relation from the end wall 42.

The flow restrictions 82 are formed by elongated strips which may be secured, by welding for example, to the inclined plates 16. Preferably, the flow restricting strips 82 are angled away from the respective inclined clarifier plates as is generally indicated in FIG. 1 and extend across a fraction of the flow passage between adjacent inclined clarifier plates. The flow restricting strips 82 provide some rigidizing reinforcement for the inclined clarifier plates 16. However, they more importantly serve as a flow restriction to regulate and produce more uniform flow from the inlet channel 40 into the various flow passages 44.

The lateral ends of the inclined clarifier plates 16 could be terminated approximately at the locations of the angled strips 82 so that the inlet channel 40 would be completely open along the entire width of the clarifier housing. However, as may be seen in FIG. 3, the lateral ends of the inclined clarifier plates 16 preferably extend closely adjacent the end walls 42 and 48 of the clarifier housing in order to divide the inlet channel 40 into vertical sections corresponding with each of the flow passages 44 between the inclined clarifier plates 16. In this manner the ends 16a of the inclined clarifier plates cooperate with the angled baffle plates 72 to assure more even distribution of solids suspended within the liquid which is introduced into the various flow passages 44.

To assemble the clarifier, the inclined interface plates 60, 62 may first be arranged upon the beams 58 and secured together by means of the brackets 64 to form the restricted channels 52. The inclined clarifier plates 16 may then be mounted in inclined relation upon the beams 58. Preferably, the inclined clarifier plates 16 are maintained in parallel spaced apart relation by means of a plurality of brackets 84 which are secured to the back of each of the plates 16. The brackets 84 are thin structural strips of metal to provide adequate support for the inclined clarifier plates 16 while causing minimum interference with liquid flow through the flow passages 44.

In addition, L-shaped brackets 86 and 88 are respectively secured at the tops and bottoms of each inclined clarifier plate 16 in order to similarly assure uniform spacing between the top and bottom edges of the adjacent plates. Still further, as may be best seen in FIG. 1, the upper and lower edges 90 and 92 are angled so that they extend vertically toward the interface assemblies 54 and 50 respectively. The angled plate edges 90 and 92 serve to further reinforce and rigidize the inclined clarifier plates 16 while also permitting more positive engagement with the inclined interface plates 60, 62.

With the inclined clarifier plates 16 being in place, the horizontal baffle plates 70 and 76 are installed followed by the vertical divider plates 68 and 74 to form the inlet chamber 20, the outlet chamber 22 and the separation chamber 24. The inclined interface plates for the interface assembly 54 may then be arranged above the inclined clarifier plates within the separation chamber 24, similar brackets being employed to form successively sized restrictive channels as described above in connection with the lower interface assembly 16.

Most of the components within the clarifier are held in place by their own weight. However, the relatively light components of the upper interface assemblies 64 may be secured to the brackets 86 in order to maintain them in place if necessary.

The inclined interface plates for the upper interface assembly are indicated at 94 and 96, pairs of oppositely inclined plates 94 and 96 being formed as V-shaped elements with the restricted channels 56a–56g being similarly established and maintained by brackets 98.

In operation, it may be necessary or desirable to adjust the dimensions of the various restrictive channels 52a–52i or 56a–56g. This may be readily accomplished for example by merely bending the L-shaped brackets 64 or 98 in order to change the spacing between the lower ends of the inclined interface plates 60, 62 or the upper ends of the inclined interface plates 94, 96.

Operation of the clarifier is believed to be clearly apparent from the preceding description. However, in summary, liquid to be clarified is introduced through the conduit 30 and passes over the flow restriction plate 66 into the inlet chamber 20. Liquid from the inlet chamber 20 is evenly distributed by the angled baffle plate 72 and the inlet channel 40 between the various flow passages 44.

The liquid flows horizontally through the flow passages 44, in a leftward direction as viewed in FIG. 3. Suspended solids settle downwardly and pass through the restrictive channels 52 into the settling chamber 28.

Similarly, low density material such as oil rises and passes through the restrictive channels 56 into the separation chamber 24. High density solids are removed from the settling chamber 28 through the conduit 34 while low density material is removed from the separation chamber 24 through the conduit 36. The flow of low density material from the separation chamber 24 is limited by a baffle 100 over which the low density material passes into a trough 102. If further phase separation occurs within the trough 102, relatively heavy liquid, usually water, is removed by means of the drain 38 while the low density material is removed or collected from the clarifier through the conduit 36.

As was indicated above, the restrictive channels 52 and 56 serve to prevent or minimize the reverse flow of liquid from the settling chamber 28 and separation chamber 24 toward the flow passages 44, particularly adjacent the outlet channel 46.

The liquid flowing through the flow passages as viewed in FIG. 3 enters the outlet channel 46 which is of substantially similar construction as the inlet channel 40 described above. The flow restricting strips 104 which correspond with the strips 82 on the inlet side similarly serve to regulate the velocity of liquid flow into the outlet channel 46. Once in the outlet channel 46, the clarifier liquid rises past the baffle plate 78 and the angled flow restricting plate 80 to exit the clarifier through the outlet conduit 32.

In certain applications, liquid entering the clarifier through the inlet conduit 30, the inlet chamber 20 and the inlet channel 40 may have an unusually high percentage of solids. For example, the solids content may be so great that the initial fallout of solids at the right end of the flow passages 44 as viewed in FIG. 3 is not accepted by the restrictive channels 52. In such an event, the inclined interface plates 60, 62 could be completely removed, especially adjacent the inlet channel 40, in order to assure the unrestricted passage of solids into the settling chamber 28. In any event, as noted above, the restrictive channels 52 adjacent the outlet channel 46 serve a more important function of restricting reverse flow of liquid from the settling chamber 28 toward the flow passages 44.

Figure 5:
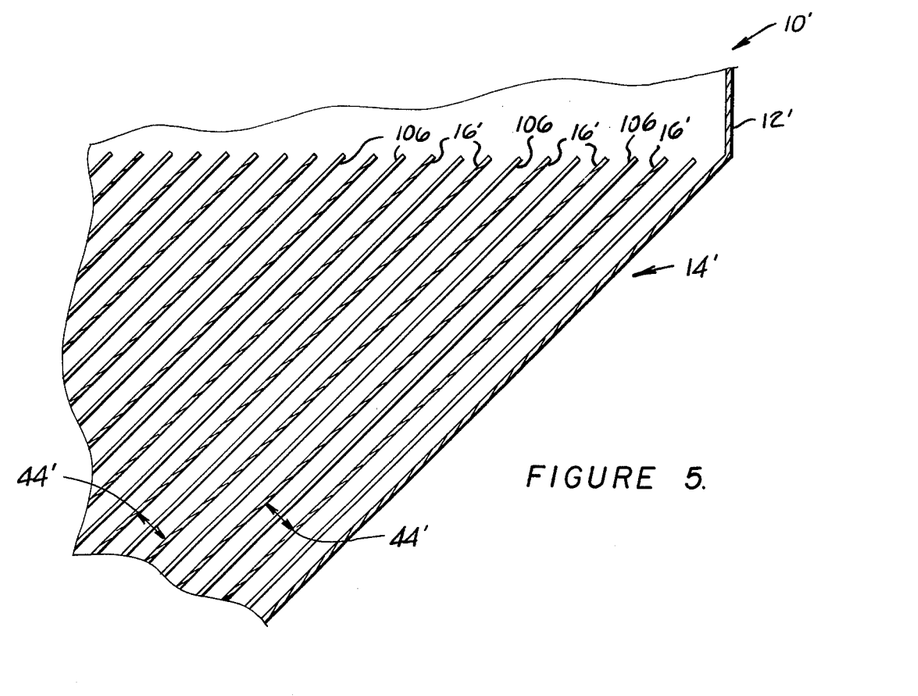
FIG. 5 is a fragmentary view of a portion of the clarifier similar to FIG. 1 while illustrating an alternate embodiment of the invention.
Figure 6:
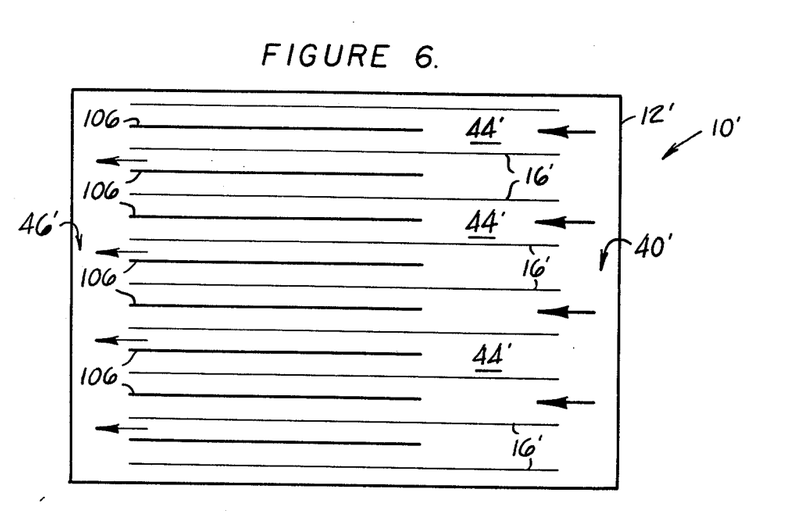
FIG. 6 is a schematic representation taken along the inclined length of the inclined plates of the clarifier to further illustrate the embodiment of FIG. 5.

Another embodiment of the clarifier is illustrated by FIGS. 5 and 6. The clarifier illustrated in these figures is generally similar to that described above in connection with FIGS. 1–4. Accordingly, components are identified by primed numerals corresponding to numerical labels employed for similar components in FIGS. 1–4. The embodiment of FIGS. 5–6 contemplates the selective use of slave plates to adjust the spacing between the major inclined clarifier plates 16'.

The spacing between the clarifier plates 16' normally determines the width of the flow passages 44'. In addition, the vertical spacing between the inclined clarifier plates determines the distance which high or low density material must pass through the liquid to be clarified before contacting one of the inclined plates. Thus, if the liquid to be clarified includes a relatively low percentage of high or low density material to be removed, the rate or quality of separation may be enhanced by selectively reducing the spacing between the plates.

In the embodiment of FIGS. 5 and 6, this is accomplished by the introduction of slave plates indicated at 106. For example, one or more slave plates 106 may be arranged between each adjacent pair of major clarifier plates 16'. The slave plates 106 may include similar brackets as those described above and indicated at 84, 86 and 88 (see FIGS. 1 and 3) for maintaining spacing of the slave plates relative to the major clarifier plates 16'. In addition, the slave plates 106 may be slotted to pass over brackets supporting the major clarifier plates 16', for example, brackets similar to those indicated at 84 in FIGS. 1 and 3.

The slave plates 106 may be supported in the same manner as the major clarifier plates 16', for example, by beams similar to those indicated at 58 in FIG. 3. The height of the slave plates 106 is preferably the same as that of the major clarifier plates 16'. The lateral dimensions of the slave plates 106 may also be similar to those for the major clarifier plates 16'. However, the lateral dimensions of the slave plates 106 may also be reduced relative to the length of the major clarifier plates 16' as indicated in FIG. 6. In FIG. 6, the lateral dimension of the slave plates 106 is foreshortened adjacent the inlet side of the clarifier in order to maintain the full spacing between the major clarifier plates 16'. Thus, liquid initially entering the flow passages between the clarifier plates is provided with additional space through which solids may pass downwardly toward a settling chamber such as that indicated at 28 in FIG. 1. As the liquid continues to pass leftwardly through the flow passages between the inclined clarifier plates, the slave plates 106 reduce the width of the flow passages in order to promote the rate and/or quality of clarification as described above.

Additional modifications and variations of the present invention are possible in addition to those described above. Accordingly, the scope of the present invention is defined only by the following appended claims.

What is claimed is:

1. An inclined plate clarifier comprising
   a housing having generally horizontal, spaced-apart support beams in a lower portion thereof,
   a plurality of clarifier plates arranged transversely upon said support beams, lateral edges of said plates being adjacent opposite end walls of said housing,
   spacer means for maintaining said clarifier plates in inclined and parallel space-apart relation to each other to form inclined flow passages therebetween,
   a vertical inlet divider plate extending transversely across said inclined plates and supported thereupon adjacent one housing end wall to form an inlet chamber above said inclined plates,
   said housing forming an inlet conduit in communication with said inlet chamber,
   a vertical outlet divider plate arranged transversely above said inclined plates and supported thereupon adjacent the other housing end wall to form an oulet chamber above said inclined plates,
   means forming inlet and outlet channels adjacent said opposite housing end walls respectively below and in communication with said inlet and outlet chambers, said inlet and outlet channels being formed so that influent from said inlet chamber tends to enter said inclined flow passages by means of said inlet channel and influent exiting said inclined flow passages tends to pass through said outlet channel to enter said outlet chamber, and said housing forming an outlet conduit in communication with said outlet chamber, the construction and arrangement of said clarifier plates and said inlet divider plate and outlet divider plate being suitable for arrangement within said housing so that they are maintained in place upon said support beams under the influence of gravity, thereby facilitating their installation and removal from the housing.

2. The clarifier of claim 1, further comprising an inlet baffle plate arranged horizontally and transversely above said inclined plates, said inlet baffle plate extending from said vertical inlet divider plate toward an adjacent end wall of said housing to restrict fluid flow between said inlet chamber and said inlet channel.

3. The clarifier of claim 2 further comprising an outlet baffle plate similarly arranged horizontally above said inclined plates and extending transversely thereacross, said outlet baffle plate extending from said vertical outlet divider plate toward said other housing end wall to restrict fluid flow between said outlet channel and said outlet chamber.

4. the clarifier of claim 1, further comprising means arranged along the lateral ends of said inclined plates adjacent said one housing end wall to restrict fluid flow between said inlet chamber and the flow passages formed between the adjacent inclined plates.

5. The clarifier of claim 4 further comprising similar means arranged along the lateral ends of said inclined plates adjacent the other housing end wall to restrict fluid flow between said outlet chamber and passages formed between adjacent inclined plates.

6. The clarifier of claim 1, further comprising plate means dividing said inlet channel into passages corresponding to said inclined flow passages between said inclined clarifier plates.

7. The clarifier of claim 6 further comprising an inlet baffle for regulating flow from said inlet chamber into said passages in said inlet channel.

8. The clarifier of claim 1 further comprising a settling chamber formed beneath said inclined plates.

9. The clarifier of claim 8 further comprising a separation chamber formed above said inclined plates and between said vertical inlet and outlet divider plates for receiving a relatively low density phase from inclined flow passages formed between adjacent inclined plates, a low density phase outlet conduit being in communication with said separation chamber.

10. The clarifier of claim 9 further comprising interface means arranged above and below said inclined plates for regulating communication between said inclined flow passages and said separation chamber and settling chamber respectively, each said interface means comprising a plurality of inclined plates extending transversely of said inclined clarifier plates to form restrictive passages permitting high and low density material to exit said inclined plate flow passages.

11. The clarifier of claim 8 further comprising interface means arranged below said inclined plates for regulating communication between said inclined plate flow passages and said settling chamber, said interface means forming restrictive passages extending transversely of said flow passages.

12. The clarifier of claim 1 further comprising interface means arranged below said inclined plates for regulating communication between said flow passages and a region beneath said interface means, said interface means forming restrictive passages extending transversely of said flow passages.

13. The clarifier of claim 12 wherein said restrictive passages are relatively smaller adjacent said outlet chamber.

14. The clarifier of claim 12 further comprising interface means arranged above said inclined plates for regulating communication between said inclined flow passages and a region above said interface means.

15. The clarifier of claim 12 wherein said interface means comprises a plurality of inclined plates extending transversely of said inclined clarifier plates to form restrictive passages and bracket means for establishing the size of said restrictive passages.

16. A cross-flow, inclined plate clarifier comprising a housing, a plurality of inclined clarifier plates arranged in parallel spaced apart and inclined relation within said housing, said inclined plates extending between opposing end walls of said housing, inlet and outlet channels being formed adjacent said respective housing end walls, inlet and outlet conduits being arranged in communication with said inlet and outlet channels respectively, and means forming a restrictive passage below said inlet channel for allowing relatively high density phase material to settle downwardly from said inlet channel prior to entry of liquid from said inlet channel into flow passages between said inclined clarifier plates, inlet and outlet chambers being formed above said inclined plates respectively adjacent said housing end walls and in communication with said inlet and outlet channels respectively, a separation chamber being formed between said inlet and outlet chambers above said inclined plates for receiving relatively low density material from the flow passages between said adjacent inclined plates, said inlet and outlet conduits being in communication with said inlet and outlet channels by means of said inlet and outlet chambers respectively.

17. The clarifier of claim 16 further comprising interface means for restricting communication between said flow channels formed by said adjacent inclined plates and said settling chamber and separation chamber respectively.

18. The clarifier of claim 17 further comprising inlet and outlet baffle plate means for restricting fluid communication between said inlet chamber and said inlet channel and between said outlet chamber and said outlet channel respectively.

19. The clarifier of claim 16 further comprising means for restricting flow between said inlet channel and said flow passages.

20. The clarifier of claim 17 further comprising plate means dividing said inlet channel into passages corresponding respectively with said flow passages.

21. The clarifier of claim 16 further comprising a settling chamber formed below said inclined plates and said inlet channel.

22. A cross-flow inclined plate clarifier comprising a housing, a plurality of inclined clarifier plates arranged in parallel, spaced apart relation within said housing and extending toward opposite end walls of said housing, means adjacent said end walls forming inlet and outlet channels respectively, inlet and outlet chambers being in communication with said inlet and outlet channels respectively, a settling chamber being formed beneath said inclined clarifier plates, and interface means being arranged beneath said inclined clarifier plates to restrict communication between inclined flow passages formed between said plates and said settling chamber, said interface means comprising a plurality of inclined interface plates extending transversely across said inclined clarifier plates, adjacent and oppositely inclined interface plates forming restricting passages for communicating said inclined flow passages with said settling chamber.

23. The clarifier of claim 22 further comprising a plurality of beams secured to said housing and extending transversely beneath said inclined plates, said inclined interface plates being formed by inverted V-shaped members arranged upon each of said beams and further comprising spacer means for establishing the size of said restriction passages.

24. The clarifier of claim 22 wherein said restriction passages are of varying size, said restriction passages being relatively large adjacent said inlet channel and relatively small adjacent said outlet channel.

25. A cross-flow, inclined plate clarifier comprising a housing, a plurality of inclined clarifier plates arranged in inclined and parallel spaced apart relation within said housing, inlet and outlet channels being formed at opposite lateral ends of said inclined clarifier plates, and extending along substantially the entire vertical height of said inclined plates, inlet and outlet chambers being arranged in communication with said inlet and outlet channels respectively, said inlet and outlet chambers being formed above said inclined plates respectively adjacent opposite end wall portions of said housing, a plurality of inclined clarifier slave plates being selectively arranged between said inclined clarifier plates to reduce the width of said clarifier flow channels and bracket means for supporting said inclined clarifier slave plates, said clarifier slave plates being of substantially the same rectangular dimensions as said inclined clarifier plates in order to form an increased number of inclined clarifier flow channels within the inclined plate clarifier, said bracket means being adapted to permit removal of said inclined clarifier slave plates in order to form inclined clarifier flow channels of increased dimension between said plurality of inclined clarifier plates.

26. The clarifier of claim 25 wherein lateral edges of said inclined clarifier slave plates are spaced apart from said inlet channel so that the full width of said clarifier flow channels between said inclined clarifier plate remains available to allow initial separation of relatively heavy suspended solids during passage of a liquid between said inlet and outlet channels.

27. A cross-flow inclined plate clarifier comprising a housing, a plurality of inclined clarifier plates arranged in parallel, spaced apart relation within said housing and extending toward opposite end walls of said housing, means adjacent said end walls forming inlet and outlet channels respectively, inlet and outlet chambers being in communication with said inlet and outlet channels respectively, a collection chamber being formed above said inclined clarifier plates to receive low density material from inclined flow passages therebetween and interface means being arranged above said inclined clarifier plates to restrict communication between said inclined flow passages and said collection chamber, said interface means comprising a plurality of inclined interface plates extending transversely across said inclined clarifier plates, adjacent and oppositely inclined interface plates forming restricting passages for communicating said inclined flow passages with said collection chamber.

28. The clarifier of claim 21 wherein said restriction passages formed above said inclined flow passages are of varying size, said restriction passages being relatively large adjacent said inlet channel and relatively small adjacent said outlet channel.

* * * * *

UNITED STATES PATENT AND TRADEMARK OFFICE
CERTIFICATE OF CORRECTION

PATENT NO. : 4,120,797
DATED : October 17, 1978
INVENTOR(S) : Werner P.E. Huebner It is certified that error appears in the above-identified patent and that said Letters Patent are hereby corrected as shown below:

Claim 20, Column 10, line 52, "claim 17" should be ---claim 19---.

Claim 28, Column 12, line 32, "claim 21" should be ---claim 27---.

Signed and Sealed this

Twenty-sixth Day of June 1979

[SEAL]

Attest:

RUTH C. MASON
*Attesting Officer*

DONALD W. BANNER
*Commissioner of Patents and Trademarks*